United States Patent
Baker et al.

(10) Patent No.: US 9,158,180 B2
(45) Date of Patent: Oct. 13, 2015

(54) LIGHT FOCUSING DEVICE

(75) Inventors: John B. Baker, Watsonville, CA (US);
Erik Sowder, Watsonville, CA (US)

(73) Assignee: ExpoImaging, Inc., Watsonville, CA (US)

( * ) Notice: Subject to any disclaimer, the term of this patent is extended or adjusted under 35 U.S.C. 154(b) by 0 days.

(21) Appl. No.: 13/619,282

(22) Filed: Sep. 14, 2012

(65) Prior Publication Data

US 2014/0079381 A1    Mar. 20, 2014

(51) Int. Cl.
*G03B 11/00* (2006.01)
*G03B 15/03* (2006.01)
*G03B 17/12* (2006.01)

(52) U.S. Cl.
CPC ............... *G03B 15/03* (2013.01); *G03B 17/12* (2013.01); *G03B 2215/0514* (2013.01); *G03B 2215/0592* (2013.01)

(58) Field of Classification Search
USPC ............. 396/25–29, 155, 174–178, 198, 199, 396/544; 348/370, 371, 373–376; 362/3, 362/198, 16–18
See application file for complete search history.

(56) References Cited

U.S. PATENT DOCUMENTS

| | | | |
|---|---|---|---|
| 4,017,727 A * | 4/1977 | Yamamoto | 362/16 |
| 5,337,104 A * | 8/1994 | Smith et al. | 396/199 |
| 5,437,104 A | 8/1995 | Chien | |
| 6,029,011 A | 2/2000 | Sato | |
| 7,748,858 B2 | 7/2010 | Fong | |
| 7,983,552 B2 * | 7/2011 | Moon et al. | 396/155 |
| 2005/0259409 A1 | 11/2005 | Pohlert et al. | |
| 2008/0181598 A1 * | 7/2008 | Kobre | 396/174 |
| 2012/0099849 A1 | 4/2012 | Onishi et al. | |
| 2013/0010134 A1 | 1/2013 | Motoki et al. | |
| 2013/0010185 A1 | 1/2013 | Motoki et al. | |
| 2014/0009671 A1 | 1/2014 | Ozone et al. | |
| 2014/0064718 A1 | 3/2014 | Imafuji et al. | |

FOREIGN PATENT DOCUMENTS

| | | | |
|---|---|---|---|
| JP | 2007-065081 A | | 3/2007 |
| JP | 2007-139871 A | | 6/2007 |
| KR | 10-2012-00266 87 | * | 3/2012 |

OTHER PUBLICATIONS

KR10-2012-0026687 Machine Translation.*
International Searching Authority, International Search Report and Written Opinion, PCT/US2013/059311, Dec. 16, 2013, 18 pages.

* cited by examiner

*Primary Examiner* — Minh Phan

(57) ABSTRACT

A light focusing device for detachably coupling to a camera with a built-in flash. The device comprises a mount for detachably coupling to the camera; a housing coupled with the mount, the housing configured to enclose the built-in flash when the built-in flash is an enabled position; and a lens coupled with the housing such that light generated by the built-in flash is focused by the lens such that intensity of the light is increased farther away than what the built-in flash is able to do on its own.

21 Claims, 5 Drawing Sheets

640A

640B

LIGHT FOCUSING DEVICE

BACKGROUND

This invention relates to the modification of light from a photographic flash built in to a camera.

BRIEF DESCRIPTION OF THE DRAWINGS

FIGS. 1-2A illustrates embodiments of a light focusing device.

The drawings referred to in this description should be understood as not being drawn to scale except if specifically noted.

BRIEF DESCRIPTION

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

In general, the use of photographic flash can enable photographers to shoot with a faster shutter speed, to freeze motion and to fill in shadows. Certain types of photography, for instance, wildlife photography and sports photography, benefit from the ability to project strobe light (e.g., a photographic flash) at a distance.

Typically, light emitted from a conventional built-in flash is spread out at a wide angle and does not provide sufficient illumination and intensity for objects at a distance from the camera.

Conventional flash modifiers for built-in flash are primarily diffusers or reflectors. That is, these modifiers attempt to soften or spread out light to make the light more flattering for portraiture by diffusing the light through a translucent material or by reflecting it off walls or ceilings.

Rather than diffuse or reflect light, the light focusing device, described herein, substantially improves the ability of a conventional built-in flash to project light at a distance by using a lens to efficiently focus the light into the reduced field of view presented by a zoom lens.

Figure 1:
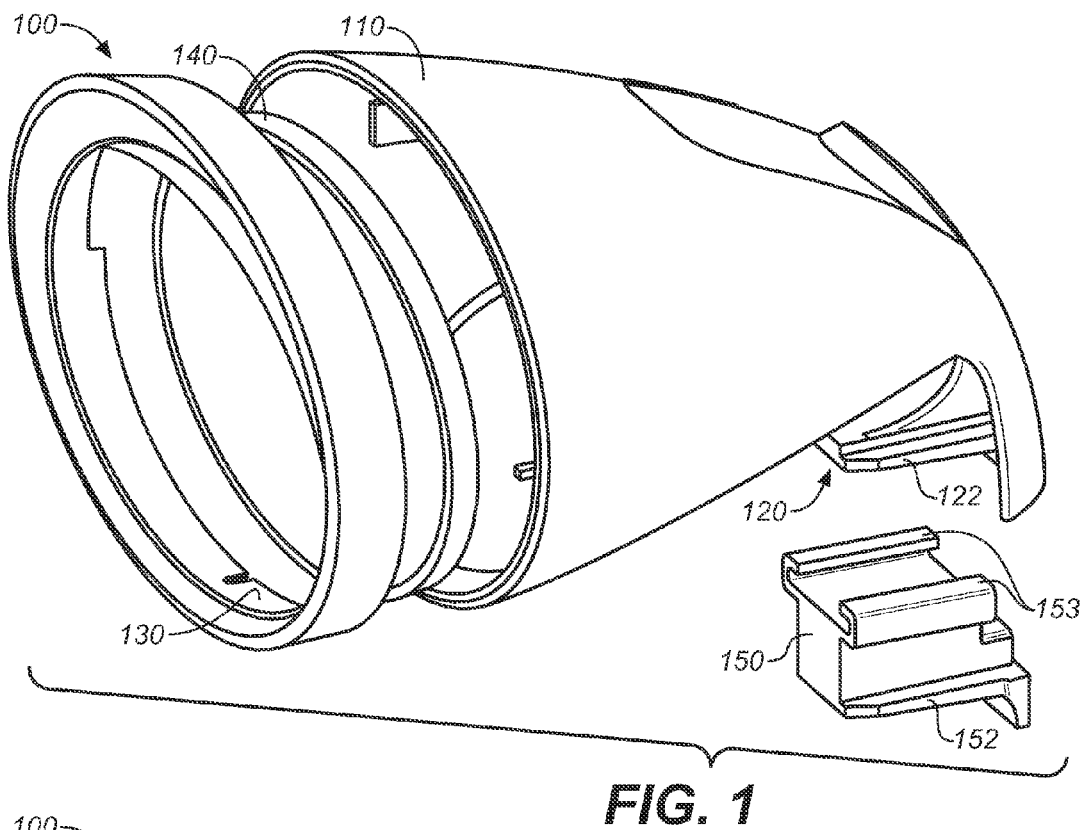

FIG. 1 depicts an exploded isometric view of an embodiment of light focusing device 100. Device 100 includes housing 110, mount 120, bezel 130, lens 140 and optionally, spacer 150.

In general, light focusing device 100 is for receiving light generated by a flash (e.g., built-in flash) of a camera, and focusing and concentrating the light at a distance which is further than what the flash is able to provide on its own, which will be described in further detail below. In other words, light focusing device 100, combined with a photographic flash, acts somewhat like a spotlight and provides sufficient illumination to illuminate objects a greater distance away from the camera than what the flash is able to provide on its own.

Figure 2A:
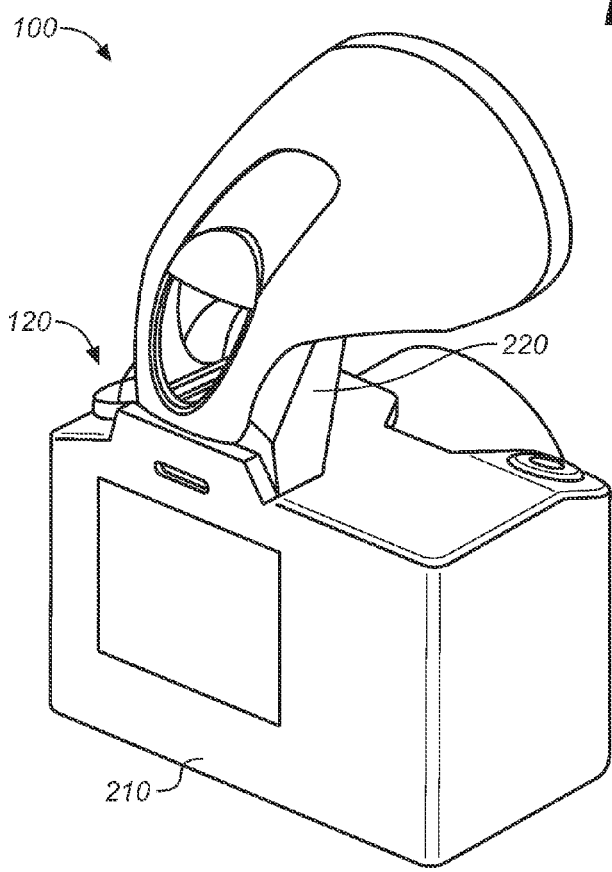
Figure 2B:
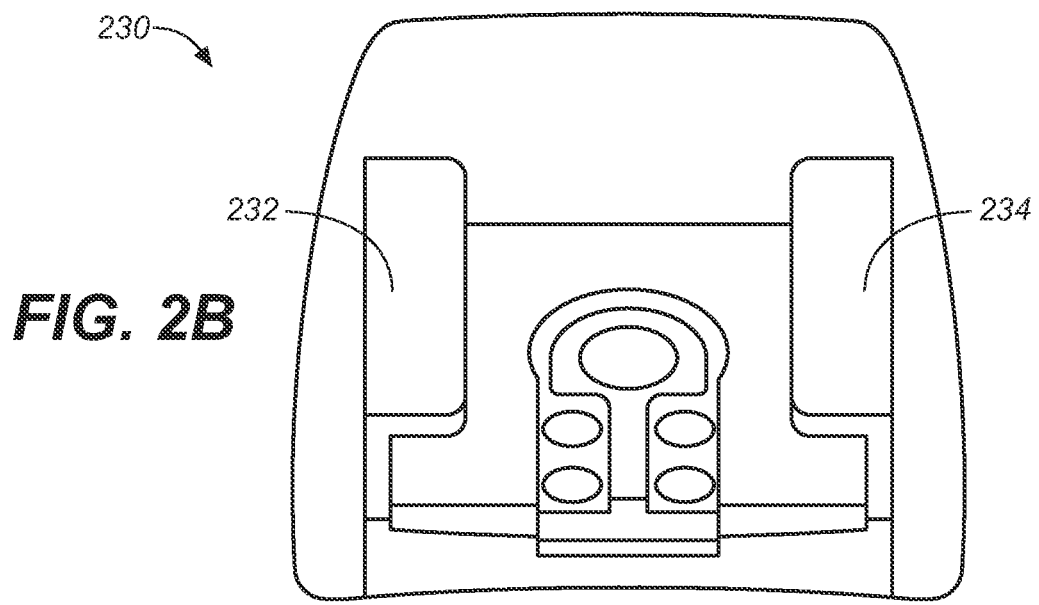
FIG. 2B illustrates an embodiment of a hot shoe.

Referring to FIGS. 1-2B, device 100 is detachably mounted to camera 210. Camera 210 can be any camera that includes flash, such as a built-in flash. For example, camera 210 can be, but is not limited to, a digital single-lens reflex (DSLR) camera or a mirrorless camera.

Camera 210 includes hot shoe, such as hot shoe 230, as depicted in FIG. 2B. A hot shoe is a mounting point on top of a camera that allows for accessories to be mounted to the camera. The hot shoe also has electrical contacts that allow for electrical communication between the accessory and the camera. It is noted that device 100 is not electrically connected to the camera when mounted in the hot shoe.

Device 100 is detachably connected to a hot shoe via mount 120. For example, feature 122 of mount 120 slides under features 232 and 234 of hot shoe 230, such that mount 120 is physically mounted or seated in hot shoe 230. It should also be appreciated that device 100 can also be connected to various mounts, such as, but not limited to a cold shoe or an eyepiece mount. A cold shoe is similar to a hot shoe except that a cold shoe does not have electrical contacts.

Housing 110 is configured to enclose built-in flash 220 when built-in flash 220 is an enabled position. Typically, the built-in flash is a pop-up unit on top of the camera (e.g., DSLR camera) and is used to supply illumination when the ambient lighting conditions drop below a certain level or when a photographer desires to use flash for creative effect. This level can be determined by the camera's exposure meter or can be manually selected by a photographer.

When in an enabled position, the built-in flash is in an extended position, as shown in FIG. 2A. When not in use, or in a disabled position, the built-in flash is typically in a retracted position. For example, the built-in flash is retracted and seated into the housing of the camera.

Typically, when accessories are mounted into the hot shoe, the enablement of the built-in flash is disabled. That is, the built-in flash is disabled from being extended into the enabled position. However, this disabling feature can be overridden. In particular, when mount 120 is seated into the hot shoe the built-in flash is able to be extended into the enabled position and is able to emit light.

Housing 110 positions the lens at an efficient distance from the flash, centers the lens in front of the flash and prevents light from being directed outside the lens. Housing 110 controls the light such that it is projected substantially forward towards lens 140. In contrast, a light emitted from a conventional flash is projected at a wide angle from the flash.

In one embodiment, housing 110 is a semi-conical shape with an elliptical end. It should be appreciated that housing 110 can be any shape that is conducive to controlling the light such that it is projected forward (in front of the camera) and directly towards lens 140.

Housing 110 is also adjustable. For example, housing 110 adjusts to allow the lens 140 to be adjusted forward, backwards, up and/or down in relation to the hot shoe mount.

Lens 140 is disposed at a distal end of housing 110. In one embodiment, bezel 130 facilitates in seating lens 140 in housing 110. For example, lens 140 is detachably disposed between bezel 130 and the distal end of housing 110.

Lens 140 is configured to control and focus the light from the flash such that the light is optimally projected to improve the quality of light from the camera. For example, by utilizing device 100, the light generated by the flash is captured and concentrated such that the intensity of light is increased farther away from the camera as compared to what the built-in flash is able to do on its own.

Figure 3:
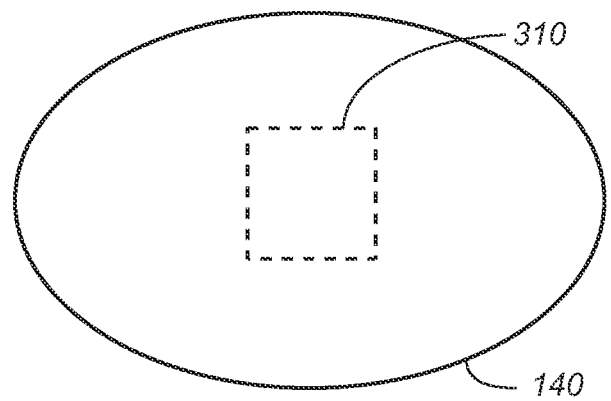
FIG. 3 illustrates an embodiment of a lens and a photographic flash centered behind the lens.

The flash or bulb 310 of the built-in flash is centered with lens 140, as depicted in FIG. 3. If the built-in flash, when in the enabled position, is not centered with lens 140, then the intensity of light and the light pattern projected from device 100 will not be optimal; the amount of light may be decreased and the pattern of light may not be uniform.

In one embodiment, spacer 150 facilitates in centering the flash with lens 140. For example, feature 122 seats with feature 153 of spacer 150, while feature 152 seats with features 232 and 234 of hot shoe 230.

Lens 140 is designed such that it is has an optimum light spread for a field of view of the camera. In particular, the lens of the camera has a focal length which creates a particular field of view. Accordingly, lens 140 is designed such that the light focused by lens 140 fits the particular field of view of the lens of the camera.

In one embodiment, lens 140 is a Fresnel lens. For example, an elliptical Fresnel lens. In general, a Fresnel lens comprises concentric grooves molded into the surface of the lens material. The grooves act as individual refracting surfaces (e.g., prisms) that focus the emitted light.

It should be appreciated that lens 140 may be any lens that focuses light, as described herein, such as but not limited to a meniscus lens.

Figure 6A:
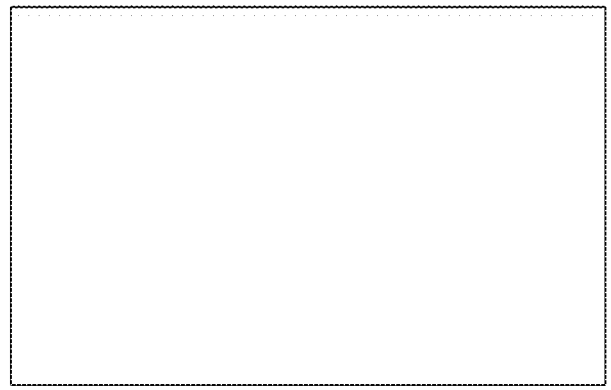
FIG. 6A-B illustrates embodiments of a lens.
Figure 6B:
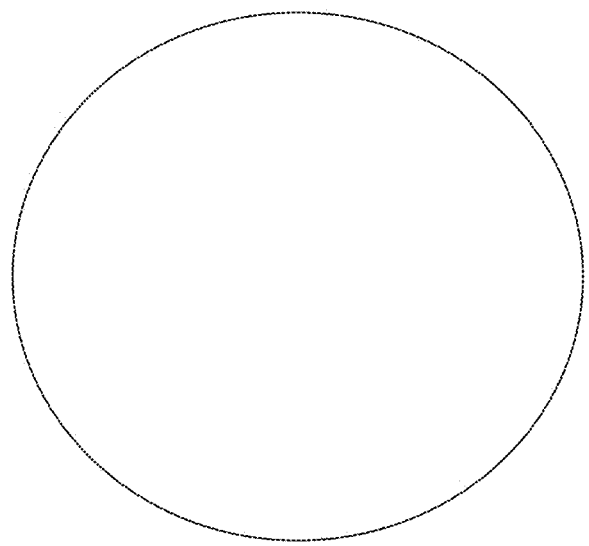

It should be appreciated that lens 140 may be any shape that is conducive to focusing the emitted light, as described herein. For example, the shape of lens 140 may be, but is not limited to a rectangular shape (e.g., lens 640A in FIG. 6A) and a circular shape (e.g., lens 640B in FIG. 6B).

In another embodiment, lens 140 has a thickness of about 1.5 mm with a focal length in the range of 2-3 inches. In a further embodiment, lens 140 is an injection molded polycarbonate. It should be appreciated that lens 140 may be comprised of various materials, such as, but not limited to plastic, glass, acrylic, etc.

Figure 4:
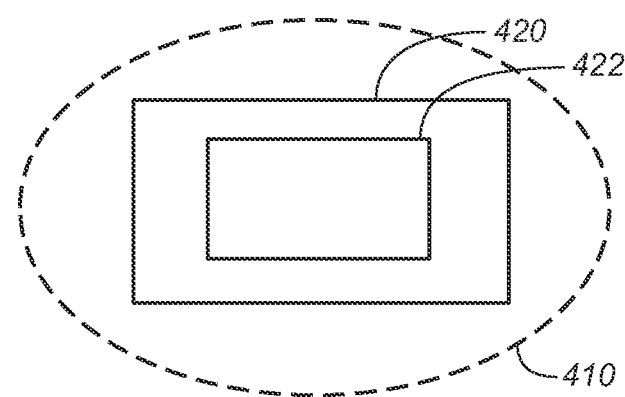
FIG. 4 illustrates an embodiment of a light spread.

FIG. 4 depicts an embodiment of the light spread 410 (or a spot of light), of device 100, with respect to various fields of view (e.g., field of view 420 and field of view 422) of the camera.

Device 100 generates light spread 410 that is larger than the field of views 420 and 422 so that there is even illumination across the whole frame at the given focal lengths. In one embodiment, device 100 generates a focused spot of light that sufficiently illuminates objects in the range of 75-100 feet away from the camera. In contrast, the built-in flash, alone, is usually designed to effectively illuminate objects no further than about 25-30 feet from the camera and does not sufficiently illuminate objects beyond that range.

In various embodiments, field of view 420 is a field of view for a lens having a focal length of 50 millimeter (mm) and a 3.2 aspect ratio; and field of view 422 is a field of view for a lens having a focal length of 200 mm and a 3.2 aspect ratio. Focal length describes the field of view that is seen. As such, the larger the focal length the narrower the field of view. In various embodiments, light spread 410 is able to provide proper light intensity and illumination for a lens focal length in the range of 50 mm to 200 mm. Other lens focal lengths could also be optimized using other embodiments.

Figure 5:
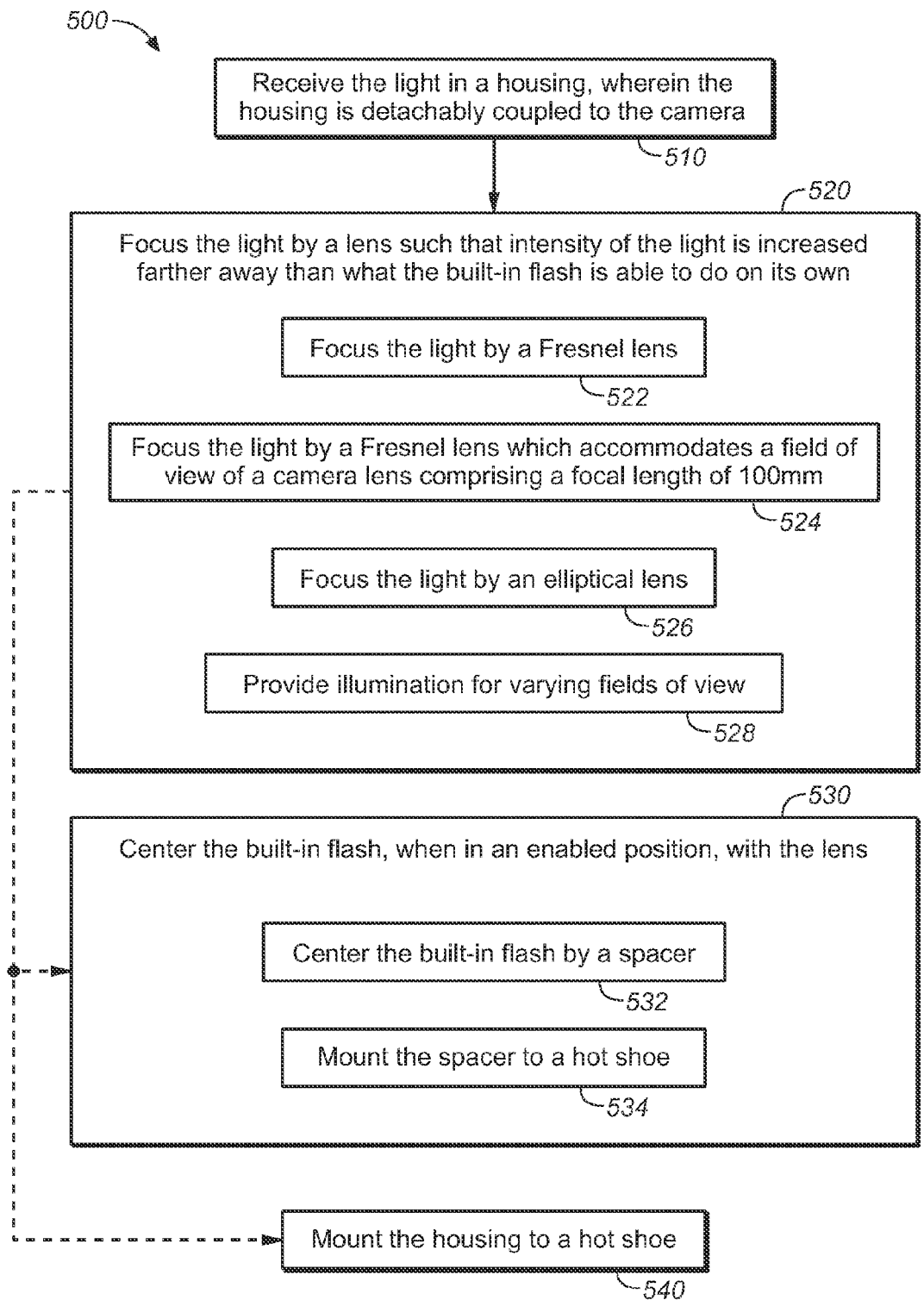
FIG. 5 illustrates an embodiment of a method for focusing light.

FIG. 5 depicts an embodiment of method 500 for focusing light generated by a built-in flash of a camera. In some embodiments, method 500 is performed at least by light focusing device 100, as depicted in at least FIG. 1.

At 510 of method 500, light is received in a housing, wherein the housing is detachably coupled to the camera. For example, housing 110 is detachably coupled to camera 210. Also, light emitted by built-in flash 220 is received in the housing.

At 520, light is focused by a lens such that intensity of the light is increased farther away than what the built-in flash is able to do on its own. For example, lens 140 is able to focus the light such that objects are sufficiently illuminated at a distance in the range of 75 feet to 100 feet.

In one embodiment, at 522, light is focused by a Fresnel lens. For example, lens 140 is a Fresnel lens.

In another embodiment, at 524, the light is focused by a Fresnel lens which accommodates a field of view of a camera lens comprising a focal length of 100 mm. For example, with reference to FIG. 4, the Fresnel lens generates light spread 410 (or a spot of light) such that field of view 420 (e.g., a field of view for a lens with a 100 mm focal length) has even illumination across the whole frame.

In a further embodiment, at 526, light is focused by an elliptical lens. For example, lens 140 is an elliptical lens.

In one embodiment, sufficient illumination is provided for varying fields of view. For example, with reference to FIG. 4, lens 140 generates sufficient light spread 410 such that fields of view 420 and 422 have even illumination across the whole frame.

At 530, the built-in flash, when in an enabled position, is centered with the lens. For example, with reference to FIG. 3, the bulb or flash, when it is in the extended and enabled position, is centered with lens 140.

In one embodiment, at 532, the built-in flash is centered by a spacer. For example, spacer 150 raises the device 100 up (away from the hot shoe) such that the built-in flash is centered with the lens.

In another embodiment, at 534, the spacer is mounted to a hot shoe. For example, spacer 150 (which detachably coupled to mount 120) is mounted in hot shoe 230 such that the built-in flash is centered with the lens.

At 540, the housing is mounted to a hot shoe. For example, housing 110 is mounted to hot shoe 230 (via mount 120) such that device 100 is detachably coupled to camera 210.

It should be appreciated that embodiments, as described herein, can be utilized or implemented alone or in combination with one another. While the present invention has been described in particular embodiments, it should be appreciated that the present invention should not be construed as limited by such embodiments, but rather construed according to the following claims.

The invention claimed is:

1. A light focusing device for detachably coupling to a camera with a built-in flash comprising:
    a mount for detachably coupling to said camera, said mount configured to engageably mount into a hot shoe;
    a housing coupled with said mount, said housing comprises an opening configured to receive said built-in flash when said built-in flash is in an enabled position; and
    a lens coupled with said housing such that light generated by said built-in flash is focused by said lens such that intensity of said light is increased farther away than what said built-in flash is able to do on its own.

2. The light focusing device of claim 1, wherein said built-in flash, when in said enabled position, is centered with said lens.

3. The light focusing device of claim 1, wherein said lens is selected from a group consisting of: a Fresnel lens, and a meniscus lens.

4. The light focusing device of claim 1, wherein said lens accommodates a field of view of a camera lens comprising a focal length of 100mm.

5. The light focusing device of claim 1, wherein said lens is selected from a group consisting of: an elliptical lens, a circular lens, a rectangular lens.

6. The light focusing device of claim 1, further comprising:
a spacer for centering said built-in flash, when in said enabled position, and said lens.

7. The light focusing device of claim 6, wherein said spacer is configured to mount in said hot shoe.

8. The light focusing device of claim 1,
wherein said housing is an adjustable housing allowing a distance of the lens to be adjusted in relation to said hot shoe.

9. The light focusing device of claim 1, wherein said lens is detachably coupled to said housing.

10. The light focusing device of claim 1, wherein said lens is disposed at a distal end of said housing.

11. The light focusing device of claim 1, wherein said lens is selected from a group consisting of: a polycarbonate lens, an acrylic lens, a glass lens, and a plastic lens.

12. A method for focusing light generated by a built-in flash of a camera, said method comprising:
mounting a housing to a hot shoe, said housing comprising an opening configured to receive said built-in flash when said built-in flash is in an enabled position;
receiving said light in a housing, wherein said housing is detachably coupled to said camera; and
focusing said light by a lens such that intensity of said light is increased farther away than what said built-in flash is able to do on its own.

13. The method of claim 12, further comprising:
centering said built-in flash, when in an enabled position, with said lens.

14. The method of claim 12, further comprising:
centering said built-in flash by a spacer.

15. The method of claim 14, further comprising:
mounting said spacer to said hot shoe.

16. The method of claim 12, wherein said focusing said light by a lens, further comprises:
focusing said light by a Fresnel lens.

17. The method of claim 12, wherein said focusing said light by Fresnel lens, further comprises:
focusing said light by an Fresnel lens which accommodates a field of view of a camera lens comprising a focal length of 100mm.

18. The method of claim 12, wherein said focusing said light by a lens, further comprises:
focusing said light by an elliptical lens.

19. The method of claim 12, wherein said focusing said light by a lens, further comprises:
providing illumination for varying fields of view.

20. A light focusing device for emulating a light emitting device that is detachably coupled to a camera with a built-in flash comprising:
a mount for detachably coupling to said camera, said mount configured to engageably mount into a hot shoe;
a housing coupled with said mount, said housing comprises an opening configured to receive said built-in flash when said built-in flash is in an enabled position; and
a lens coupled with said housing such that light generated by said built-in flash is focused by said lens such that intensity of said light is increased farther away than what said built-in flash is able to do on its own emulating the light emitting device.

21. A method for emulating a light emitting device by focusing light generated by a built-in flash of a camera, said method comprising:
mounting a housing to a hot shoe, said housing comprising an opening configured to receive said built-in flash when said built-in flash is in an enabled position;
receiving said light in a housing, wherein said housing is detachably coupled to said camera; and
emulating the light emitting device by focusing said light by a lens such that intensity of said light is increased farther away than what said built-in flash is able to do on its own.

* * * * *